(12) United States Patent
Nguyen

(10) Patent No.: US 7,365,511 B2
(45) Date of Patent: Apr. 29, 2008

(54) METHODS TO CONTROL HIGH SPEED ELECTRIC MACHINES HAVING A FRONT-END EMI FILTER ATTACHED

(75) Inventor: Vietson M. Nguyen, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 11/519,748

(22) Filed: Sep. 12, 2006

(65) Prior Publication Data

US 2008/0061729 A1 Mar. 13, 2008

(51) Int. Cl.
*G05B 5/01* (2006.01)

(52) U.S. Cl. ............... 318/611; 318/632; 318/671; 318/448

(58) Field of Classification Search ........ 318/611, 318/621, 623, 629, 632, 671, 268, 432, 448, 318/456, 461, 478, 479
See application file for complete search history.

(56) References Cited

U.S. PATENT DOCUMENTS

| | | | | |
|---|---|---|---|---|
| 4,668,898 A | * | 5/1987 | Harms et al. ............... 318/254 |
| 5,327,064 A | * | 7/1994 | Arakawa et al. ............ 318/801 |
| 5,912,541 A | * | 6/1999 | Bigler et al. ................ 318/600 |
| 6,029,767 A | * | 2/2000 | Kifuku ........................ 180/443 |
| 6,141,494 A | * | 10/2000 | Nishino et al. ............. 388/811 |
| 6,229,719 B1 | * | 5/2001 | Sakai et al. .................... 363/37 |
| 6,735,284 B2 | * | 5/2004 | Cheong et al. ............. 318/801 |
| 6,781,333 B2 | * | 8/2004 | Koide et al. ................ 318/432 |
| 7,023,165 B2 | * | 4/2006 | Kuwano et al. ............ 318/685 |
| 7,030,589 B2 | * | 4/2006 | Kaneko et al. ............. 318/802 |
| 7,084,604 B2 | * | 8/2006 | Salomaki .................... 318/811 |
| 2006/0006825 A1 | * | 1/2006 | Inaguma et al. ............ 318/432 |
| 2006/0125437 A1 | * | 6/2006 | Kitano ........................ 318/432 |

* cited by examiner

*Primary Examiner*—Bentsu Ro
(74) *Attorney, Agent, or Firm*—Carlson, Gaskey & Olds

(57) ABSTRACT

A system and method for extracting estimated input voltage and input current values of an AC motor based on sensed power inverter output voltage and output current when the AC motor is connected to a front-end EMI filter and the EMI filter is connected to a power inverter. Where the system includes a current estimator portion, and a voltage estimator portion. The estimated input values are used by a feedback controller in the power inverter to control the motor. A second system and method for extracting estimated an input current of an AC motor based on the actual motor input voltage, and the output voltage of the power inverter.

8 Claims, 2 Drawing Sheets

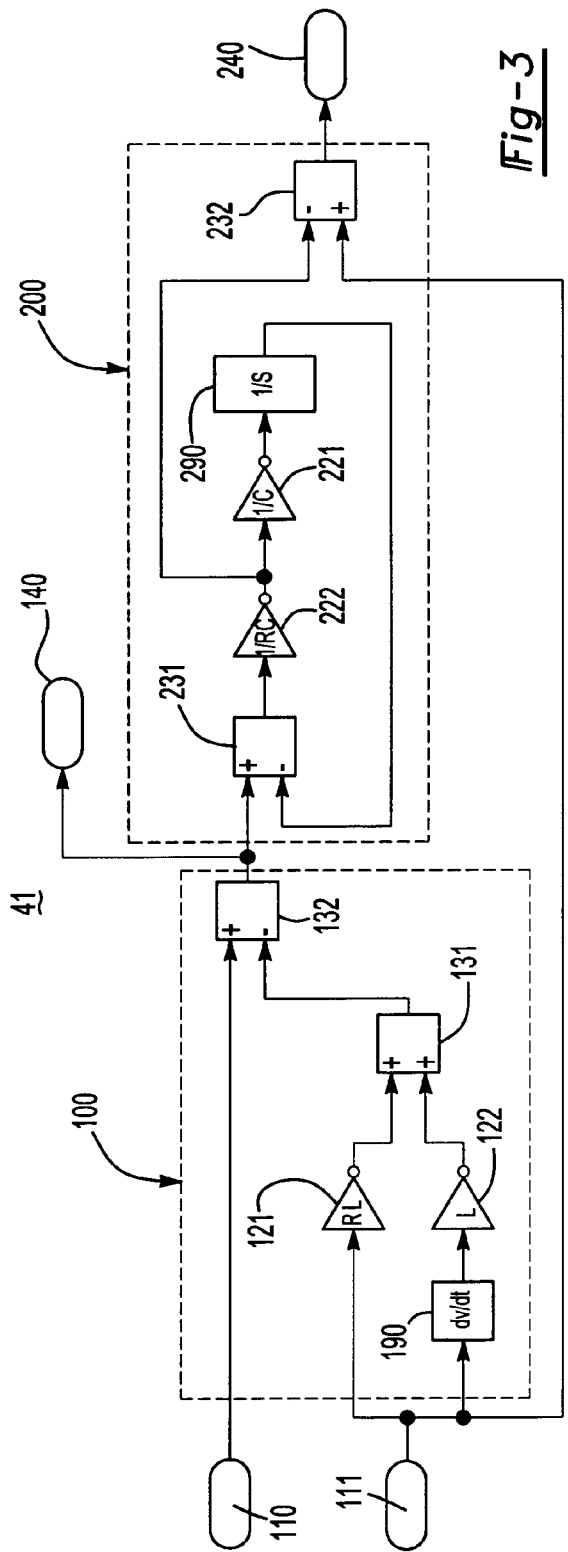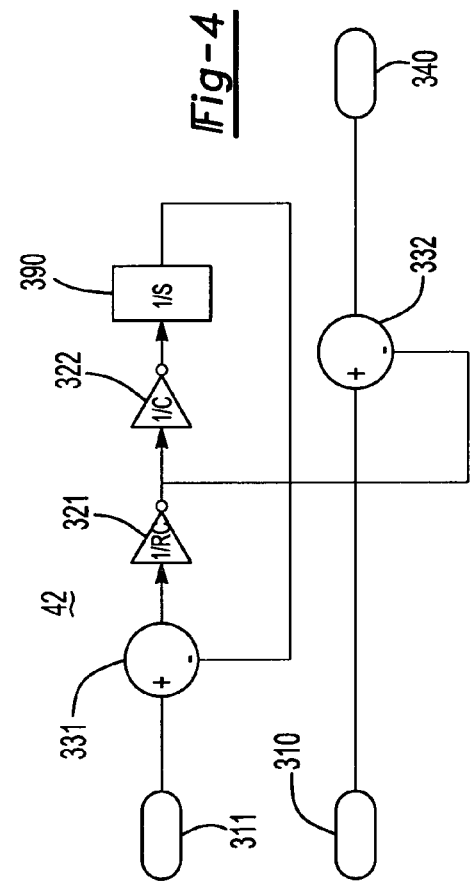

METHODS TO CONTROL HIGH SPEED ELECTRIC MACHINES HAVING A FRONT-END EMI FILTER ATTACHED

BACKGROUND OF THE INVENTION

This invention deals with an improved method of controlling a high speed electric motor, which has a front-end Electromagnetic Interference (EMI) filter attached. By extracting estimated voltage and current values of the motor windings based on sensed power inverter output values, a controls scheme that is more accurate than the prior art controls schemes is obtained.

In industrial applications, regular electric motors are often driven by variable frequency power source. A variable frequency power source is used because in many motors the frequency of the input power controls the speed of the motor. A variable frequency power inverter converts Direct Current (DC) power into Alternating Current (AC) power. Variable frequency power inverters have the capability to adjust the frequency and voltage of the AC power. This allows the power inverter to control the speed and torque of an AC motor attached to it by adjusting both the frequency and voltage of its power output. In most applications the power inverter is connected directly to the motor with no intermediate EMI filter connections. This practice is common for motors of all sizes in most operations and provides the motor with standard power, though not clean power. Clean power is the power that is provided relatively free of electronic and electromagnetic noises and is typically achieved through the use of an EMI (Electro-Magnetic Interference) filter.

Some operations, for example aerospace and aircraft applications among others, have very limited electrical tolerances and thus require clean power. Clean power is achieved once a filter has been applied and electrical noise has been filtered off of the power transmission. To achieve clean power in the present setting it is necessary to introduce an EMI filter between the power inverter and the motor winding terminals. Since EMI filters are often set up in complicated inductance-capacitance formats, the electrical values (such as current, voltage, and impedance) of the EMI filter in high power, high frequency, and high speed applications become complex issues as the power level output of the power inverter increases. Simultaneously the electrical values of the motor parameters decrease as the power level output of the power inverter increases. As a result the electrical values of the EMI filter become substantially large relative to the electrical values of the motor parameters. This results in the output voltage and current of the power inverter being significantly affected by the EMI filter.

In the prior art methods of controlling motors in this configuration the voltage and current values at the output of the power inverter have been sensed and then erroneously used to control the motor by assuming them to be the voltage and current values at the input of the motor windings. Feedback controls, such as the ones used in the prior art, work by measuring the value of the voltage and current at the power inverter output and assuming them to be the voltage and current values of the motor, ignoring the effect that the EMI filter has on the voltage and current values. The controller then adjusts the input to the power inverter accordingly using the normal pulse-width modulation switching methods (i.e. depending on the load demands, the power inverter switching pattern can be varied to increase or decrease the output voltage and frequency applied into the motor inputs) The influence of the EMI filter on the voltage and current values increases the amount of time it takes to correct any improper voltage and current values in the motor control system, and it may give some disturbance response during transient due to an imbalance between the supply and demand sides of the electric machine. The duration of time necessary to correct the values is referred to as the response time. Erroneously assuming the power inverter output values to be the actual motor winding values results in a controls scheme that is slowed down or sluggish, as well as less accurate than desired.

SUMMARY OF THE INVENTION

It would be desirable for both the power inverter output values and the actual motor winding voltage and current to be sensed. This would allow for accurate feedback control, eliminate the need for estimating the values, and dramatically hasten the response time of the controllers.

When an EMI filter is placed between the power inverter and the motor it is often economically or technologically impractical to sense the actual motor winding voltage and current. This invention discloses the use of an estimator circuit to extract an estimated motor winding input voltage and input current from an actual power inverter output voltage and output current. The feedback time of the estimator circuit is slower than directly sensing the motor winding voltage and current. However, the estimator circuit is a vast improvement over the prior art method of assuming the power inverter values to be the motor winding values. The feedback this embodiment gives is more accurate and results in a quicker response time than the prior art method of using the power inverter output values for its control signal.

If the situation permits a voltage reading at the EMI filter output to be taken, in addition to voltage and current readings at the power inverter output, a second embodiment may be used. In the second embodiment of the invention the motor winding current is estimated using the sensed power inverter voltage and output current, and the sensed EMI filter voltage. Under this embodiment a simpler estimator circuit is used to extract the motor winding voltage and current from the EMI filter output voltage and the power inverter output voltage and current.

These embodiments provide for a faster response time then the prior art methods because a more accurate estimate of the motor winding voltage and current outputs is determined than the prior art method of using the voltage and current values of the power inverter output.

These and other features of the present invention can be best understood from the following specification and drawings, the following of which is a brief description.

BRIEF DESCRIPTION OF THE DRAWINGS

FIG. 3 is a block diagram of an estimator used to estimate the motor voltage and current when the power inverter input and output voltages and currents are sensed.

FIG. 4 is a block diagram of a simplified estimator in the case that the inverter voltage, the inverter output current and the EMI filter voltage can be sensed.

DETAILED DESCRIPTION OF THE PREFERRED EMBODIMENT

Figure 1:
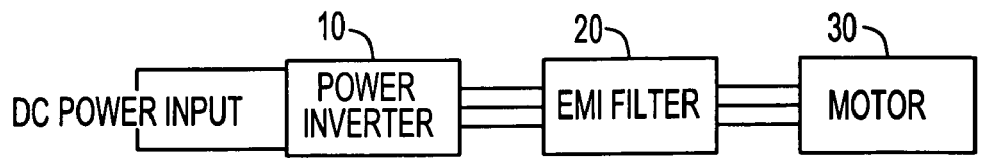
FIG. 1 is a block diagram of a power circuit with an attached EMI filter in a typical configuration.
Figure 2A:
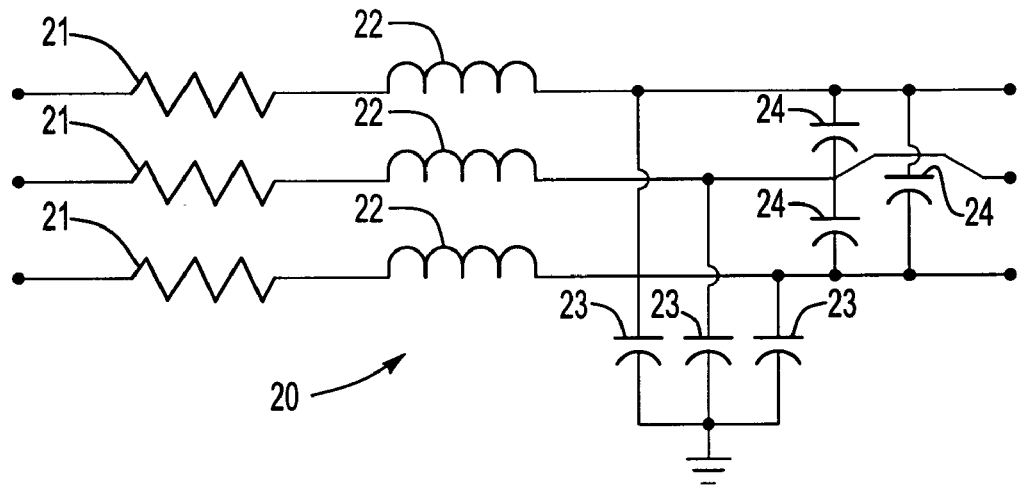
FIG. 2A is the general circuit layout of a three phase EMI filter with no specified component values.
Figure 2B:
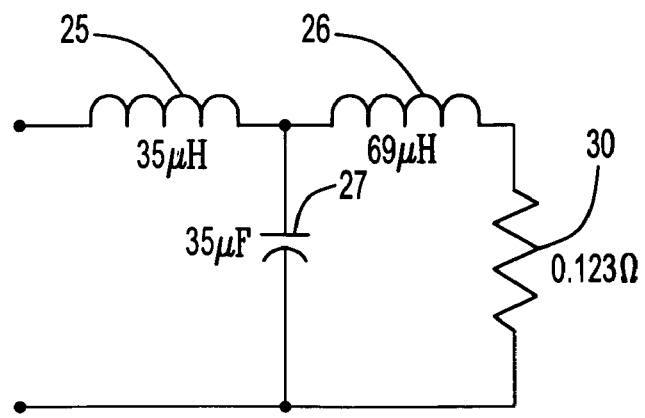
FIG. 2B is an example of potential component values of one phase path of a typical three phase EMI filter together with the motor impedance in a single phase form; the back-EMF voltage is not included in the figure for simplicity.

In the disclosed embodiments of the invention a power inverter 10 is connected to an EMI filter 20 which is then connected to a motor 30 as seen in FIG. 1. The EMI filter 20 has a general three phase construction as shown in FIG. 2A with each phase having an inductor 22, which has an equivalent serial resistance 21, a capacitor 23 connected to ground in a Y format, and connections to capacitors 24 arranged in a delta pattern connecting all three phases. A specific example of a sample EMI filter single phase layout is shown in FIG. 2B with sample component values in the first inductor (35 µH) 25 and capacitor (35 µF) 27. The inductor 26 and resistor 30 represent the motor impedance in a single phase format assuming that the internal back EMF is inherently present but not shown. The single phase layout of the EMI Filter is constructed in FIG. 2B by just a simple inductance-capacitance format.

Because of the high inductance and capacitance values of a typical EMI filter such as the EMI filter illustrated in FIGS. 2A and 2B compared to the motor's internal impedance, the power inverter output current and voltage values are not accurate estimates of the AC motor winding input values. If it is not possible to measure the values of the EMI filter output, then it is desirable to introduce an estimator to achieve a more accurate estimate of the actual AC motor winding input values than is achieved using the prior art method.

FIGS. 3 and 4 illustrate estimator circuits 41 and 42. In both estimator circuit 41 and estimator circuit 42 the value "RL" in gain block 121 refers to the ESR (equivalent serial resistance) of the overall filter inductor 20, the value "L" in gain blocks 121 and 122, refers to the overall inductance of the EMI filter 20, the value "RC" in gain blocks 222, and 321 refers to the ESR of the filter capacitor and the value "C" in gain blocks 222, 221, 321, and 322 refers to the overall capacitance of the EMI filter 20.

Estimator circuit 41 estimates both the motor voltage, in the voltage estimator 100, and the motor current, in the current estimator 200. In the voltage estimator 100 the voltage drop across the EMI filter 20 is estimated. In the illustrated circuit this estimated voltage drop is based on the EMI filter 20 input current and the rate of change of the EMI filter 20 input current, however any method to determine an accurate estimate of the voltage drop could be used. Once the voltage drop estimate has been determined it is then subtracted from the actual power inverter output voltage to obtain the estimated motor winding input voltage. In the illustrated circuit this is done in a summation block 132.

In order to obtain the estimated motor winding input voltage in the illustrated embodiment the following steps should be performed. First the voltage estimator 100 accepts the output current value of the power inverter at an input 111, and the output voltage value of the power inverter at an input 110. The value at input 111 is then multiplied by RL in a gain block 121, and sent to a summation block 131. The value at input 111 is also sent to a derivative block 190 where its derivative is taken. This value is then multiplied by L in a gain block 122, and the output value is passed to summation block 131. Summation block 131 sums the output of gain blocks 121 and 122. The input value 110 is sent to a summation block 132. The output of summation block 131 is then subtracted from the input value 110 in summation block 132. Finally the voltage estimator 100 outputs an estimated motor winding voltage 140. Once an estimated motor winding voltage is determined it is the output at output terminal 140. This output may be connected to the power inverter controller input terminals and the value may then be used to control the power inverter 10.

The current estimator 200 works by estimating the effect the EMI filter 20 has on the overall current and subtracting the value of the estimated effect from the power inverter 10 output current. In the embodiment illustrated in Figure the output of gain block 222 is an estimate of the affect the EMI filter 20 has on the current. This estimate is based on the estimated voltage from the voltage estimator 100 and on the overall resistance and capacitance of the EMI filter 20. The estimated change in current from gain block 222 is subtracted from the actual power inverter output current from input 111 to obtain an estimated motor winding input current.

In order to obtain the estimated motor winding current using the method summarized above the following steps should be followed. Summation block 231 accepts the estimated motor voltage from the voltage estimator 100 then subtracts the output of integrator block 290. The output of gain block 231 is multiplied by 1/RC in gain block 222. The output of gain block 222 is then multiplied by 1/C in gain block 221 and passed to integrator block 290. The output of gain block 222 is also sent to summation block 232. Summation block 232 accepts the power inverter output current from input 111. Then summation block 232 subtracts the output of gain block 222 from the value of input 111. The resultant value is the estimated motor current 240. Once an estimated motor winding current is obtained, it is sent to output terminal 240. Output terminal 240 may be connected to the power inverter controller inputs and the estimated value may then be used to control the power inverter 10.

While an estimated motor winding input voltage and current can be achieved utilizing the above system, a system where only the motor winding input current is estimated would provide a faster feedback and better controls for the motor. Such a system is possible when the EMI filter output voltage, the power inverter output voltage, and the power inverter output current are measured. Estimator circuit 42 illustrates such a system. Estimator circuit 42 works in the same way as the current estimator 200 from estimator circuit 41, described above, with one difference. In estimator circuit 42 the voltage value used to make the estimate is not an estimated voltage value, as in estimator circuit 41, but instead the voltage value used is an actual measured input voltage value 311 of the motor windings.

The specific operations of estimator circuit 42 as shown in the illustrated embodiment are as follows. The output of integrator block 390 is subtracted from the EMI filter output voltage in summation block 331. The output of summation block 331 is multiplied by 1/RC in gain block 321. The output of gain block 321 is then multiplied by 1/C in gain block 322 and then sent into integrator block 390 where it is integrated. The output of gain block 321 is additionally passed to summation block 322 where it is subtracted from input 310 (the power inverter output current). Summation block 332 then outputs an estimated motor current to output terminal 340. Output terminal 340 may be connected to the power inverter controller inputs and the estimated current value from output terminal 340 may be used to control the power inverter.

The estimator circuit can be in the form of a microcomputer, a digital signal processor (DSP), software or an analog control. This invention extends to any such implementation.

Although multiple embodiments of this invention have been disclosed, a worker of ordinary skill in the art would recognize that certain modifications would come within the scope of this invention. For that reason, the following claims should be studied to determine the true scope and content of this invention.

The invention claimed is:

1. An electrical system, comprising:
a motor controller and an estimator circuit, wherein said estimator circuit utilizes actual motor controller output values, and estimates input values for an electrical motor;
where the estimator circuit receives a value representing the actual motor input voltage,
where the estimator circuit contains a current estimator portion, and
where the motor input current estimator portion uses an actual motor input voltage and an actual motor controller output current to estimate a motor input current.

2. An electrical system, comprising:
a motor;
a motor controller;
an estimator circuit, wherein said estimator circuit utilizes actual motor controller output values, and estimates electrical motor input values, and
where the estimator circuit receives a value representing the actual motor input voltage,
a motor input current estimator portion uses an actual motor input voltage and an actual motor controller output current to estimate a motor input current.

3. A method for controlling an AC machine comprising the steps of:
providing a power inverter and a secondary device in series prior to a motor;
sensing an output current and an output voltage of said power inverter;
estimating a motor input voltage based on the power inverter output voltage and the power inverter output current;
estimating a motor input current based on the power inverter output current and the estimated motor input voltage;
and utilizing said estimated input current and input voltage in a feedback control system to control said AC machine.

4. The method of claim 3 where the estimated motor input voltage is an actual sensed motor input voltage.

5. An electrical system, comprising:
a motor controller and an estimator circuit, wherein said estimator circuit utilizes actual motor controller output values, and estimates input values for an electrical motor,
where the estimator circuit contains a motor input voltage estimator portion and a motor input current estimator portion, and
where the motor input voltage estimator portion uses an actual motor controller output current, a derivative of the actual motor controller output current, and an actual motor controller output voltage to estimate the motor input voltage.

6. An electrical system, comprising:
a motor controller and an estimator circuit, wherein said estimator circuit utilizes actual motor controller output values, and estimates input values for an electrical motor,
where the estimator circuit contains a motor input voltage estimator portion and a motor input current estimator portion, and
where the motor input current estimator portion uses an estimated motor input voltage and an actual motor controller output current to estimate the motor input current.

7. An electrical system, comprising:
a motor;
a motor controller;
an estimator circuit, wherein said estimator circuit utilizes actual motor controller output values, and estimates electrical motor input values;
where said estimator circuit contains a motor input voltage estimator portion and a motor input current estimator portion, and
where said motor input voltage estimator portion uses an actual motor controller output current, a derivative of the actual motor controller output current, and an actual motor controller output voltage to estimate the motor input voltage.

8. An electrical system, comprising:
a motor;
a motor controller;
an estimator circuit, wherein said estimator circuit utilizes actual motor controller output values, and estimates electrical motor input values;
where said estimator circuit contains a motor input voltage estimator portion and a motor input current estimator portion, and
where said motor input current estimator portion uses an estimated motor input voltage and an actual motor controller output current to estimate the motor input current.

* * * * *

UNITED STATES PATENT AND TRADEMARK OFFICE
CERTIFICATE OF CORRECTION

PATENT NO.       : 7,365,511 B2                                        Page 1 of 1
APPLICATION NO.  : 11/519748
DATED            : April 29, 2008
INVENTOR(S)      : Nguyen It is certified that error appears in the above-identified patent and that said Letters Patent is hereby corrected as shown below:

Claim 2, Column 5, line 31:  Insert --where-- before "a"

Signed and Sealed this

Sixteenth Day of December, 2008

JON W. DUDAS
*Director of the United States Patent and Trademark Office*